United States Patent [19]
Guichard

[11] 3,789,699
[45] Feb. 5, 1974

[54] INFINITELY VARIABLE-SPEED FRICTION TRANSMISSION

[76] Inventor: Louis Guichard, 10 Impasse Henri Bouchard 21, Dijon, France

[22] Filed: Mar. 10, 1972

[21] Appl. No.: 233,701

[30] Foreign Application Priority Data
Mar. 11, 1971  France .............................. 7108449

[52] U.S. Cl. ...................... 74/796, 74/208, 74/214
[51] Int. Cl. ...................... F16h 15/50, F16h 55/32
[58] Field of Search ...................................... 74/796

[56] References Cited
UNITED STATES PATENTS

| | | | |
|---|---|---|---|
| 2,501,936 | 3/1950 | Gayer | 74/796 |
| 2,555,119 | 5/1951 | Elliott | 74/796 |
| 2,559,230 | 7/1951 | Schottler | 74/796 |
| 2,836,994 | 6/1958 | Weber | 74/796 |
| 2,973,671 | 3/1961 | Elkins | 74/796 |
| 3,035,459 | 5/1962 | Legros | 74/796 |

Primary Examiner—Charles J. Myhre
Assistant Examiner—Thomas C. Perry
Attorney, Agent, or Firm—Linton & Linton

[57] ABSTRACT

This transmission mechanism adapted to provide an infinitely variable range of reduction ratios comprises radially supported tapered rollers of elongated configuration comprising on one side a relatively large driven cone having a rectilinear generatrix and a moderate inclination, adapted to roll inside a driven race also of tapered configuration and moderate width, and on the other side a very narrow bearing cone adapted to roll inside a tapered bearing race of greater width, having a rectilinear generatrix and a moderate inclination.

The contact pressure between the rollers and races, which is necessary for transmitting the torques, is obtained through the combined actions of the centrifugal forces generated by the rotation of said rollers about the main axis of the device, by self-clamping devices responsive to the driving torques and by radial thrust spring each acting upon a separate roller.

11 Claims, 10 Drawing Figures

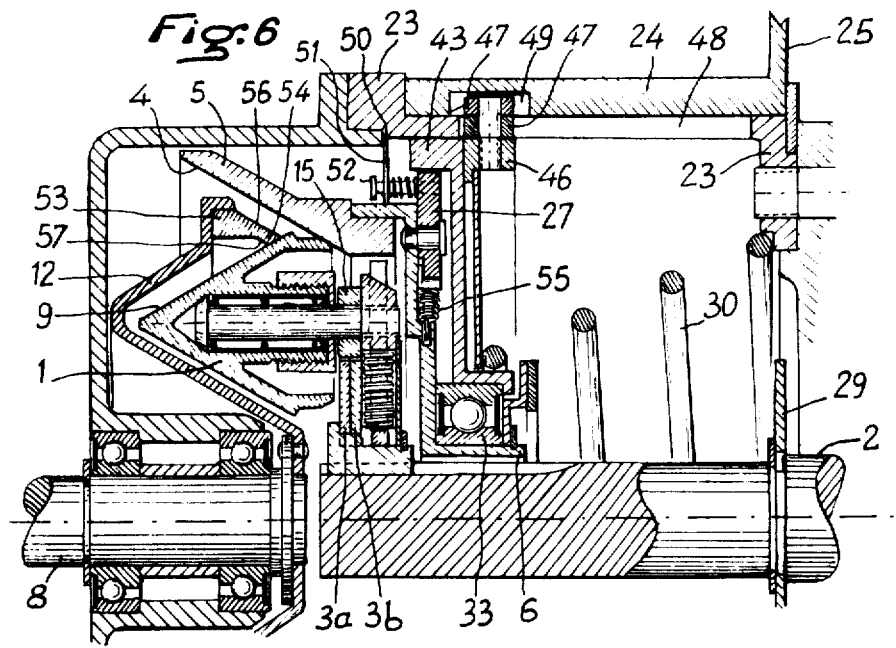
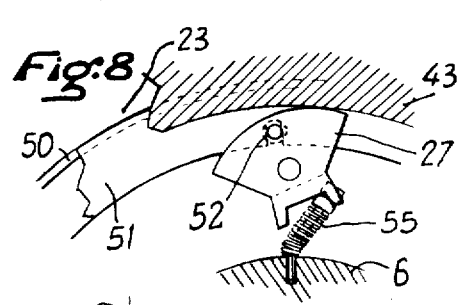
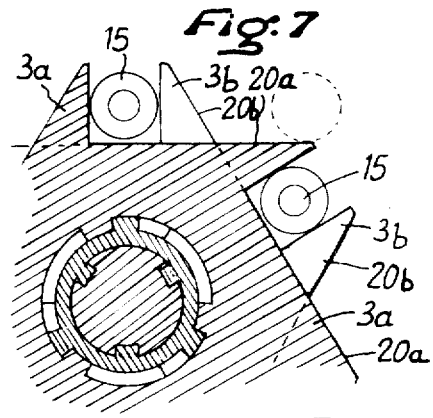
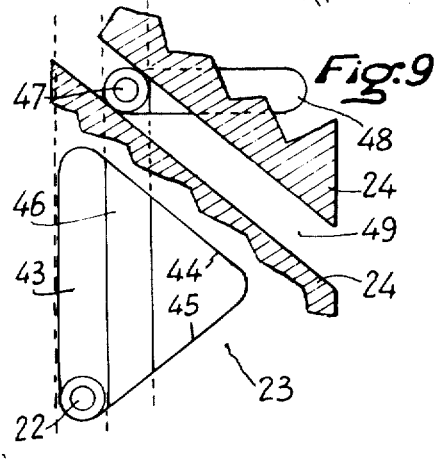
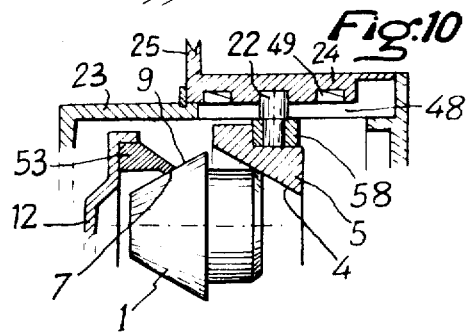

3,789,699

INFINITELY VARIABLE-SPEED FRICTION TRANSMISSION

BACKGROUND OF THE INVENTION

1. Field of the Invention

This invention relates to transmission mechanisms providing an infinitely variable speed ratio, and more particularly to drives for transmitting speeds and torques from a driving shaft to a driven shaft, of the type comprising a series of double taper rollers adapted to move radially and axially, which are rotatably driven at the speed of a driving shaft while remaining all in a same plane with their axes parallel to the axis of the mechanism, said rollers rolling inside two coaxial races, i. e. on the one hand a bearing race adapted to be either held against rotation during the speed variation periods or rotatably driven to provide the direct drive, and on the other hand a torque-receiving race rotatably rigid with the driven shaft.

2. Description of the Prior Art

These known devices are particularly advantageous notably on account of the fact that they provide a range of infinitely variable speeds on either side of the zero speed position, i.e. either towards reduced negative speeds or towards positive speeds up to the direct drive, and a universal control which may be at will either manual, whether the mechanism is operating or not, or through servo means, or automatic.

SUMMARY OF THE INVENTION

It is the essential object of the present invention to provide a mechanism of the type broadly described hereinabove, which is particularly simple, light in weight, clean, operable in all positions, easy to manufacture, assemble and disassemble, of relatively low cost, and of which the various possible forms of embodiment (some of which are described hereinafter) provide very simple and economical solutions to the essential problems concerning variable-speed and coupling mechanisms that may arise in actual practice.

The mechanism according to this invention is characterized essentially in that the driving contact between the taper rollers and the pair of coaxial races is a dry friction one so that, due to the elimination of an oil sump in the case and to the use of material having a very high coefficient of dry friction, it is possible to transmit given torques with relatively low loads through the contact points of the friction members, thus affording a substantial reduction in the weight of parts and in manufacturing costs, while permitting the operation of the mechanism in all positions without any risk of producing losses of lubricant.

This particular transmission system requires the use of specific shapes and designs for the double-taper rollers and races, and more particularly rollers of elongated configuration comprising on the one hand a driven taper having a rectilinear generatrix of moderate inclination, adapted to roll inside a reaction race of conical configuration and relatively moderate width, and on the other hand a very narrow bearing cone adapted to roll inside a wider bearing race of tapered configuration having a rectilinear generatrix and a moderate inclination.

According to another feature characterizing this invention, the contact pressures between the rollers and the races, which are necessary for transmitting torques, are obtained through the joint action of the centrifugal forces generated by the rotation of said rollers about the general axis of the transmission mechanism, of self-clamping devices responsive to the driving torque and of radial spring means applying a thrust to each roller.

Other complementary features of this device will appear as the following description proceeds with reference notably to means implemented for obtaining the desired variation in the reduction ratio, the external means for controlling this variation, the holding of the bearing races against rotation during the speed variation, and the driving of said bearing race for rotation in orer to obtain the direct-drive operation of the assembly.

BRIEF DESCRIPTION OF THE DRAWING

Various preferred forms of embodiment of the invention will now be described by way of example with reference to the attached drawings, in which :

FIG. 6 is another upper half-view in axial section showing a modified form of embodiment of the mechanism which is not automatic as a function of the output torques, with external control means and a stationary case ;

FIG. 7 is a fragmentary view of the arrangement for driving the rollers from a pair of plates disposed side by side and provided with inverted self-clamping ramps ;

FIG. 8 is a detail showing a bidirectional free-wheel device adapting itself automatically to the momentary direction of rotation of the drive ;

FIG. 9 is a fragmentary external and developed view of the variation control system, and FIG. 10 is a fragmentary upper half-view of a very simplified modification of the arrangement shown in FIG. 6, without direct drive.

DESCRIPTION OF THE PREFERRED EMBODIMENTS

Figure 1:
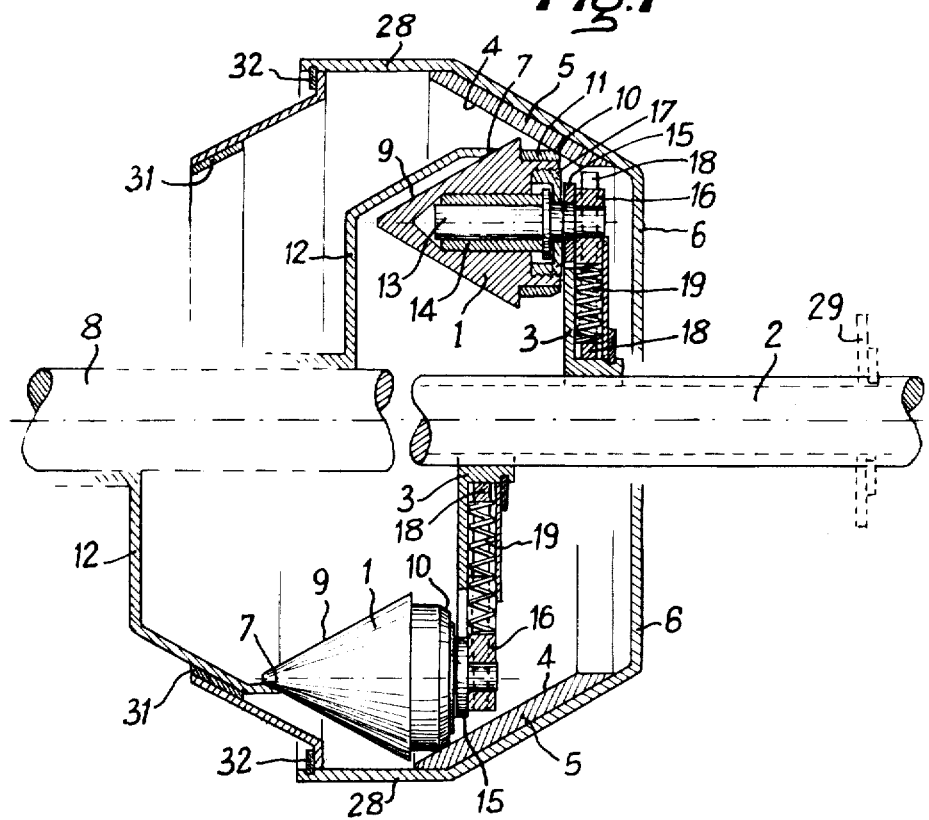
FIG. 1 is a longitudinal axial section showing diagrammatically the essential features and basic principles of the transmission mechanism of this invention, its various element being shown in a position of infinite ratio in the upper half of the Figure and in direct-drive position in the lower half.

In the various Figures of the drawings, all the parts having the same functions in the mechanism are designated by the same reference numerals.

The basic and known principles of transmission mechanisms of this general type will firstly be briefly described.

Referring to FIG. 1, the device comprises a series of double-taper or biconical rollers 1 disposed circularly on a common radius and having their axes constantly kept substantially parallel to the general or main axis of the transmission mechanism. These rollers 1 are rotatably driven from the power or driving shaft 2 through a carrier plate 3 having an internally splined hub slidably engaging matching splines formed on said driving shaft 2. The rollers 1 revolve inside a pair of coaxial races, on the one hand a so-called bearing race 4 formed on or carried by the tapered ring 5 secured in turn to the bearing case 6, and on the other hand a so-called driven race 7 rotatably rigid with the driven shaft 8.

The races 4 and 7 are adapted to move axially towards and away from each other, and it is clear that the reduction ratio is at any time subordinate to the relative spacing of these races 4 and 7 which determines the contact position between the tapered contact surfaces of said rollers 1 and races 4, 7.

Throughout the variation range the bearing plate 6 is held against rotation so that the rollers 1 can apply reaction torques to the race 4 ; in the position corresponding to the maximum relative spacing of races 4 and 7 (as shown in the lower half of the Figure) the same plate 6 is rotatably driven to provide the direct drive.

The novel features characterizing the device of this invention lie in the combination of the following means:

The dry friction drive is obtained preferably through the mutual contact of different materials selected the one among relatively hard, wear-resisting materials such as steel or cast-iron, and the other among friction materials characterized by a relatively high coefficient of friction and a very good resistance to wear and overheating, such as composite materials consisting essentially of hard elastomers or synthetic resins, reinforced or not with various fibre materials, these materials being mentioned by way of example, not of limitation.

The body of said rollers 1, of generally elongated configuration, comprises on the one hand a relatively wide driving cone 9 having a rectilinear generatrix and a relatively moderate angle, and on the other hand a relatively very narrow bearing or reaction cone 10 formed in general on a ring-shaped insert 11 of relatively hard material, fitted to the aforesaid body of roller 1.

The bearing race 4 is relatively wide, tapered and has a rectilinear generatrix of moderate inclination.

The driven race 7 is very narrow and carried directly by a driven plate 12 rotatably rigid with the driven shaft 8.

The roller 1 revolves about a shaft 13 with the interposition of a self-lubricating bushing 14 or bearing needles. This shaft 13 carries a small ring 15 and is secured at right angles to a sliding plate or radial arm 16. An annular plug 17 is screwed or force fitted in the major base of roller 1 to retain and seal the roller 1 on shaft 13.

Figure 2:
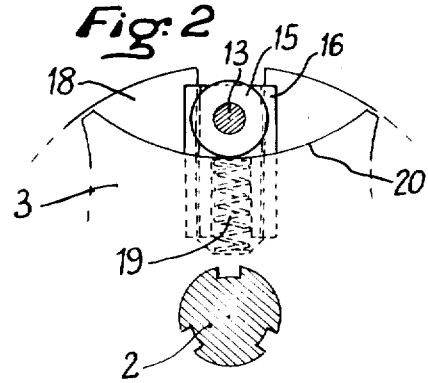
FIG. 2 is a fragmentary cross-section showing the self-clamping device associated with or responsive to the driving torque, and the arrangement of a radial spring.
Figure 3:
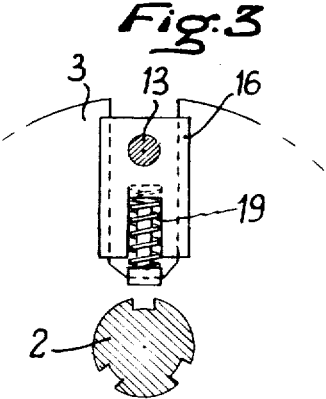
FIG. 3 is a view similar to FIG. 2 but showing the direct driving of a roller without any self-clamping effect, with the corresponding radial spring.

The sliding plate or radial arm 16 has a generally rectangular configuration (FIGS. 2 and 3) and has formed opposite grooves along its lateral major sides to permit its sliding movement in a relatively wide radial notch or slot formed in the roller carrier plate 18 and, in its inner central portion, a slot in which a relatively small radial thrust spring 19 is housed.

The roller carrier plate 18 is loosely mounted (see FIGS. 1 and 2) on the hub or driving plate 3 which bears self-clamping cam faces 20 adapted to engage the aforesaid small rings 15 and producing the drive as well as the increment in the contact loads of rollers 1 in races 4 and 7 as a function of the driving torques and mainly in the positions providing the highst reduction ratios.

For certain applications, the small plates or radial arms 16 of rollers 1 may be driven directly from driving plate 3 (FIG. 3) without resorting to any self-clamping means.

Figure 4:
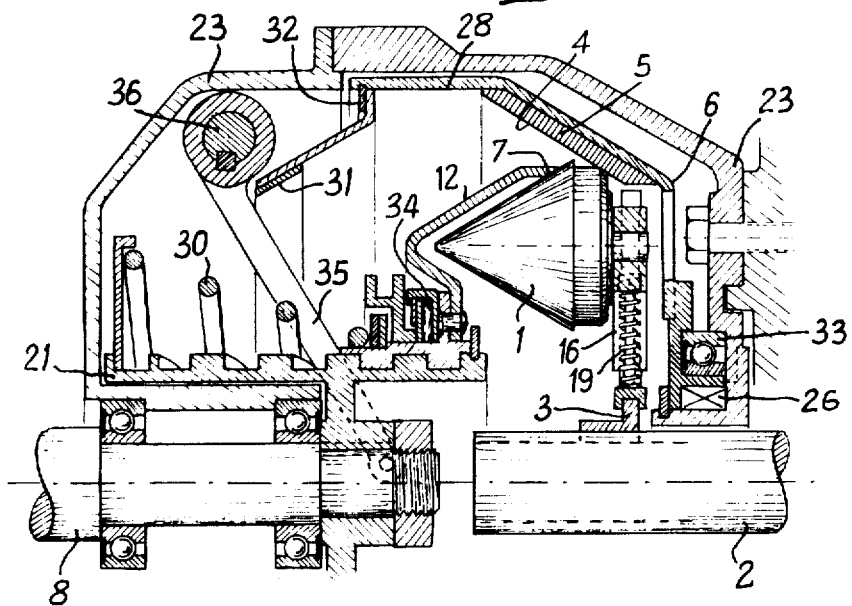
FIG. 4 is an axial sectional view showing the upper half of a fully automatic transmission mechanism comprising external correcting means and a stationary case.
Figure 5:
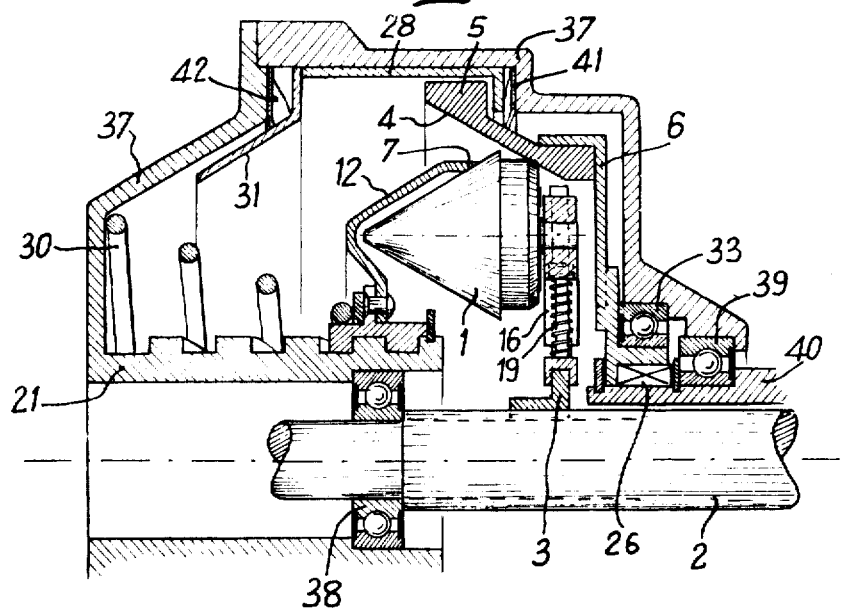
FIG. 5 is a view similar to FIG. 4 but showing a modified form of embodiment, also fully automatic, but with a rotary case and without external correcting means.

The relative spacing of races 4 and 7, which determines the reduction ratio variation, is obtained :

a. either by axially moving the driven plate 12 as explained presently with reference to FIGS. 4 and 5, said driven plate 12 being rotatably rigid with the driven shaft 8 through a hub 21 formed with longpitch ramps or helical screw threads adapted to exert an axial thrust against said plate 12 and to produce an automatic variation as a function of the output torques ;

b. or by axially moving the reaction or bearing plate 6 or bearing ring 5 as will be explained presently with reference to FIGS. 6 to 10, this axial movement being controlled from outside, without producing any automatic variation as a function of output torques.

The external reduction-ratio variation control means comprise essentially a device incorporating pins or rollers 22 slidably engaging cam faces formed in the stationary case 23 and adapted to be moved axially by rotating a relatively large external ring 24 solid with a control lever 25 (see FIGS. 6. 9 and 10).

The reaction or bearing race 4 is held against rotation, during the variation, either through a unidirectional freewheel device 26 (FIGS. 4 and 5) when the driving motor or power source has only one direction of rotation, or through an automatic bidirectional freewheel device 27 (FIGS. 6 and 8) capable or operating in the two directions of rotation of the motor or power source.

Finally, the bearing race 4 is rotatably driven, in order to obtain the direct drive condition, either through a bell-shaped member 28 (see FIGS. 1, 4 and 5) causing the reaction race 4 to become rigid with the driven plate 12 and the end of the axial movement of this plate, or through an axial movement and a clutch-like engagement between said plate 6 and a small disk 29 rigid with the driving shaft (FIG. 1, in dash lines, and FIG. 6).

Now the operation of the device illustrated in FIG. 4 will be described, the device being shown in its zero-speed position. When the driving shaft 2 rotates, the rollers 1 are driven at a relatively high speed about the axis of the transmission mechanism and due to the joint action of the centrifugal force and of the radial springs 19 they tend to move away from said axis, but at the same time these rollers, due to their oblique contact with bearing ring 5, tend to move axially to the left as seen in FIG. 4. This double movement of rollers 1 is permitted by the axial sliding mounting of plates 16 and also by the axial sliding movement of driving plate 3 on driving shaft 2. At the same time, the rollers 1 tend to move the driven plate 12 to the left while compressing the return spring 30 and producing the automatic variation in the reduction ratio, as a function both of the speed of the driving shaft 2 generating variable centrifugal forces and of the torques transmitted to the driven shaft 8, as already explained in the foregoing. At the end of the axial stroke, the driven plate 12 engages the clutch cone 31 secured by a circlip 32 to the bell-shaped member 28 rigid with the bearing plate 6, which is thus rotatably driven in the direction permitted by the freewheel device 26, thus providing the direct drive condition, i.e. the rotation as a unit of all the movable parts of the transmission mechanism. A rotary thrust bearing 33 is adapted to retain and centre the plate 6.

If necessary, means for correcting the automatic operation may be provided, for example in the form of a rotary thrust member 34 disposed behind the drive plate 12 and adapted to be pushed axially by a fork 35 rigid with a control shaft 36 emerging from the stationary case 23.

This external correcting device may also be associated with a device (not shown) for braking the bearing plate 6 in order to produce a power braking effect adjustable in all reduction ratios.

FIG. 5 merely shows a modified form of embodiment of the device illustrated in FIG. 4 ; this structure is also fully automatic as a function of the driving speeds and output torques. It comprises a rotary casing 37 rigid with the driven hub 21, centered on the one hand to a ball-bearing 38 carried by the driving shaft 2 and on the other hand to another ball-bearing 39 carried like the freewheel 26 by a socket 40.

A special device for driving the bearing plate 6 is provided, and comprises a bell-shaped member 28 rotatably solid with the rotary casing 37 but adapted to slide axially, this member 28 being urged on the one hand to the left, as seen in the Figure, by a resilient washer 41, and on the other hand to the right by another resilient washer 42 slightly stronger than washer 41. During a speed variation, the bell-shaped member 28 is disengaged from the bearing ring 5. At this end of the movement of driven plate 12 the latter pushes the cone 31, compresses the spring 42 and thus enables the first spring 41 to cause the engagement of bell-shaped member 28 with bearing ring 5 to provide the direct drive conditions.

This device permits of dispensing with the use of a circlip such as 32 in FIG. 4, thus facilitating the assembling and disassembling of the apparatus.

The general and special arrangement of the apparatus illustrated in FIG. 5 permits on the other hand to obtain a range of automatic speed variation in reverse by simply holding the case 37 against movement and taking or deriving the output torque from the socket 40 which, in the above-description, was considered as a stationary part.

In the same arrangement illustrated in FIG. 5 the driving shaft 2 may have its input end on the left or on the right, as desired.

FIG. 6 illustrates an arrangement which is not automatic as a function of the output torques, the driven plate 12 being secured directly to the driven shaft 8. The speed variation is obtained by causing the axial translation to the right of bearing plate 6. It is controlled from the exterior by a device comprising a control plate 43 (FIGS. 6 and 9) carrying at least three pins or small rollers 22 movable along either of a pair of oblique ramps or cam faces 44, 45 formed in the wall of the stationary case 23 and bearing constantly against the control ring 46 carrying likewise at least three pins or rollers 47 movable simultaneously in longitudinal slots 48 formed in the wall of the stationary case 23 and also in helical grooves 49 formed in the large external control ring 24.

Irrespective of the direction of rotation of the power source or motor, the bearing torques of rollers 22 against either of said ramps or cam faces 44 and 45 determine the application of axial thrusts against the plate 43, in opposition to the thrusts produced on the same plate 43 by the self-clamping ramps 20 as a consequence of variable driving torques, thus reducing the efforts necessary for actuating said external control means.

To permit the operation of the device in either direction of rotation of the driving means or motor, the invention further provides the driving of rollers 1 from a device comprising two plates 3a and 3b disposed side by side (FIGS. 6 and 7) having mutually inverted ramps or cam faces 20, these plates being driven from the power hub with a substantial angular clearance.

To the same end, this invention also provides a bidirectional freewheel device (FIGS. 6 and 8) comprising a cam 27 fulcrumed to the bearing plate 6 and adapted to lock the control plate 43 in either direction, according as said cam 27 is tilted to the left or to the right. The tilting of cam 27 in the proper direction is obtained automatically, when the apparatus is started, as a consequence of the engagement at 50 between the plate 51 rotatably solid with pin 52 of cam 27 and the casing 23. A small spring 55 constantly urges the cam 27 in either of its two end positions, but when the mechanism operates in direct drive, as a consequence of the engagement between the bearing plate 6 and the disk 29, the centrifugal force exerted on cam 27 will keep the latter in its intermediate position, thus eliminating any contact in the control plate 43.

Although the apparatus illustrated in FIG. 6 is not fully automatic, it nevertheless permits the automatic return to the zero-speed position each time the motor is stopped or retarded considerably, due to the provision of the return spring 30 and also to the reversibility of the control device. It also permits the automatic ratio increment when re-starting the motor, up to a predetermined position, for example by means of an external adjustable abutment member (not shown) adapted to be engaged by the external contol lever 25. The time required for this automatic speed increment may also be adjusted, if necessary, by using an adjustable time-lag device (not shown) secured to said external lever 25.

This apparatus, thus equipped, affords a simple and easy solution to most variation and coupling problems.

In certain specific applications, the variable-speed transmission must be operated during relatively long time periods at a predetermined ratio, and this ratio must be maintained at a stable value irrespective of the wear and tear of the movable parts involved, without having to interfere with the control or adjustment means. To meet this specific requirement, the present invention provides on the driven plate 12 a driven ring 53 consisting of friction material having a lower coefficient of friction than the driven cone 9 of roller 1. This driven ring 53 comprises a relatively narrow collar 54 disposed between two cones 56 and 57 having a taper substantially parallel to that of said bearing race 4. Thus, even in case of substantial wear of said driven collar 54 and given a specific position of the control member, the contact positions of the two tapers of said rollers are not modified, so that the reduction ratios depending thereon remain unchanged.

In this specific case, the body of roller 1 and its two rolling tapered surfaces 9 and 10 consist of a single piece of the material having the highest wear resistance, hollowed out to reduce weight and improve the cooling.

FIG. 10 illustrates a very simplified form of embodiment of the structure shown in FIG. 6. The bearing ring 5 is secured directly to the control ring 58. This construction does not provide a direct drive but permits of attaning a wide range of negative speeds by utilizing the areas of major diameters of driven tapers 9 of roller 1, beyond the intermediate zero-speed area.

All the apparatus described hereinabove operate in a dry medium, i.e. without using an oil sump ; therefore, it is possible in all cases to form in the casing walls and in the plates relatively large openings ensuring a satisfactory internal ventilation, and permitting the inspection of movable parts, without disassembling them or removing the circlip 32 provided in the construction shown in FIG. 4.

Of course, this description should not be construed as limiting the scope of the invention since various modifications or constructional additions may be contemplated without departing from the basic principles of the invention which must be taken in its broadest meaning. Thus different combinations of the above-described means may be used, and self-lubricating rings or washers may be substituted for the ball-bearings and thrust bearings, or alternatively the contours of the self-clamping ramps or cam faces 20 may be modified, or the driven plate 12 may be secured directly to the input shaft of the machine to be driven, so that the cover of case 23, driven shaft 8 and output bearings may be dispensed with, and a freewheel device may be disposed between the driving and driven shafts 2, 8 for utilizing the engine braking effect, these two shafts being if desired arranged concentrically into each other so that the input and output can be disposed on the same side of the apparatus, without departing from the basic principles of the invention as set forth in the appended claims.

What I claim is :

1. A coupling and variable-speed transmission mechanism comprising a driving shaft, a driven shaft, a casing having said shafts extending therein, a series of biconical rollers positioned circularly around said driving shaft and each roller having a bore, roll members in said roller bores, means slideably supported on said driving shaft for radial and axial movements, shafts carried by said means parallel to said driving and driven shafts with each shaft extending in the roll in the bore of one of said rollers, plugs detachably mounted in and closing said bores and roll members therein, two coaxial races positioned inside said casing and capable of being moved towards and away from one another, one of said races being a driven race connected to said driven shaft for rotation therewith, the other of said races being a bearing race held against rotation in the various positions of the mechanism and said races being positioned at maximum relative spacing in the direct drive condition of the mechanism, said rollers being positioned inside and in mutual contact by dry friction with said races, said rollers being of dry friction materials having a high rigidity, a high resistance to wear and a high resistance to overheating as well as a large coefficient of friction, said rollers having an elongated configuration and comprising on one hand a wide driven cone having a rectilinear generatrix and a moderate inclination positioned for rolling inside said driven race, and on the other hand a very narrow bearing cone positioned for rolling inside said bearing race, said driven race being of a tapered configuration and very small width and said bearing race being of a tapered configuration of large width, having a rectilinear generatrix and a moderate inclination.

2. A mechanism as claimed in claim 1 wherein the dry friction materials of said rollers and races comprise steel and cast iron, on the one hand, and composite materials containing essentially hard elastomers or synthetic resins on the other hand.

3. A mechanism as claimed in claim 2 wherein said synthetic resins are reinforced with fiber materials.

4. A mechanism as claimed in claim 2 wherein said means comprises arms keyed to and extending radially from said driving shaft and each arm has a pair of opposite grooves in its lateral major sides, plates each have radial slots mating with the grooves of one of said arms for sliding thereon and carrying one of said roller supporting shafts extending at right angles thereto, each said arm having a slot in its central portion, thrust springs in said slots tending to move said plates from said driving shaft, rings being provided on said roller shafts, and driving plates operatively connected to said driving shaft and each driving plate having a self-clamping cam face engaging one of said rings.

5. A mechanism as claimed in claim 4 including a driven plate supporting said driven race, a hub having helical screw-threads and mounted on said driven shaft, a sleeve meshing with said hub screw-threads, said driven plate being carried by said sleeve, a rotary thrust member disposed behind said driven plate, a control shaft extending through said casing, a fork attached to said control shaft and capable of pushing said thrust member for permitting correction of the automatic variation or external control of this variation of the driven plate.

6. A mechanism as claimed in claim 4 including a bearing ring mounted for axial movement and supporting said bearing race for obtaining the varition in the driving speed of said driven shaft non-automatically as a function of the output torques, a control ring fixed to said bearing ring, pins projecting radially from said control ring, said casing having longitudinal openings with said pins extending therethrough, a rotary ring on said casing having helical slots with said pins extending therein and a control lever connected to said rotary ring.

7. A mechanism as claimed in claim 4 including a bearing plate supporting said bearing race, a member held against rotation, a unidirectional free-wheel device interposed between said bearing plate and said member held against rotation whereby said bearing race is held against rotation when the mechanism is not operating in direct drive.

8. A mechanism as claimed in claim 1 including a bell-shaped member carrying said bearing race, a driven plate mounted for axial movement and suporting said driven race, said driven plate being capable of movement towards said bell-shaped member and said bearing race whereby a direct drive operation of the mechanism is provided by the engagement of said driven plate with said bearing race causing said bearing race to rotate with said driven plate.

9. A mechanism as claimed in claim 2 wherein said driven plate is of friction material having a lower resistance to wear, said driven plate comprises a relatively narrow collar portion formed between a pair of tapered surfaces having an inclination substantially parallel to that of said bearing race whereby a stable reduction ratio can be obtained even in the case of substantial wear of said collar as a consequence of a relatively long operation at a predetermined adjustment position and each of said rollers and its two rolling tapered surfaces consisting of a single piece of material having a high wear resistance and hollowed out to reduce weight and to improve the cooling thereof.

10. A mechanism as claimed in claim 1 wherein means holds said driven members against rotation, a bearing plate supports said bearing race, a member is fixed to said bearing plate, providing the output drive and thus a range of negative variations in the mechanism transmission.

11. A mechanism as claimed in claim 1 including two plates disposed side by side on said driving shaft and having mutually inverted ramps coacting with said roller shafts and said two plates being connected to said driving shaft for being driven thereby with a substantial angular clearance.

* * * * *